United States Patent [19]

Blake

[11] Patent Number: 4,569,960
[45] Date of Patent: * Feb. 11, 1986

[54] WATER-DISPERSIBLE PRESSURE-SENSITIVE ADHESIVE AND TAPE MADE THEREWITH

[75] Inventor: Frederick D. Blake, Woodbury, Minn.

[73] Assignee: Minnesota Mining and Manufacturing Company, St. Paul, Minn.

[*] Notice: The portion of the term of this patent subsequent to Nov. 1, 2000 has been disclaimed.

[21] Appl. No.: 635,446

[22] Filed: Jul. 30, 1984

Related U.S. Application Data

[63] Continuation-in-part of Ser. No. 529,565, Sep. 6, 1983, abandoned.

[51] Int. Cl.[4] ................................................. C08K 3/32
[52] U.S. Cl. ..................................... 524/145; 524/245; 524/249; 524/560; 428/355; 428/356
[58] Field of Search .............. 524/187, 272, 145, 127, 524/245, 249, 560; 428/355, 356

[56] References Cited

U.S. PATENT DOCUMENTS

| | | | |
|---|---|---|---|
| 2,838,421 | 6/1958 | Sohl | 117/122 |
| 3,441,430 | 4/1969 | Peterson | 117/68.5 |
| 3,661,874 | 5/1972 | Olson | 260/83.3 |
| 3,865,770 | 2/1975 | Blake | 260/27 R |
| 4,413,080 | 11/1983 | Blake | 524/187 |

*Primary Examiner*—Edith Buffalow
*Attorney, Agent, or Firm*—Donald M. Sell; James A. Smith; Richard E. Brink

[57] ABSTRACT

Repulpable splicing tape, especially adapted for splicing carbonless paper. The preferred adhesive is a blend of acrylate:acrylic acid copolymer, NaOH and/or LiOH, KOH, and certain ethoxylated plasticizing components. A small amount of polyamide-epichlorohydrin crosslinker may also be included.

14 Claims, No Drawings

WATER-DISPERSIBLE PRESSURE-SENSITIVE ADHESIVE AND TAPE MADE THEREWITH

CROSS-REFERENCE TO RELATED CASE

This application is a continuation-in-part of application Ser. No. 529,565, filed Sept. 6, 1983, now abandoned.

BACKGROUND OF THE INVENTION

This invention relates to water-dispersible pressure-sensitive adhesives and to normally tacky and pressure-sensitive adhesive tapes made therewith.

Papermaking and printing operations require splicing the end of one roll of paper to the beginning of another, as well as splicing together a roll after defective material is cut out. It is important that such splices be made quickly and easily, necessitating the use of an adhesive that rapidly attains maximum strength and retains it throughout subsequent operations. In an era where ecology and conservation are both vital concerns, it is important that the spliced portions not be destroyed but that they be returned to the paper mill for reprocessing; it is thus essential that the splices (particularly the adhesive which is used to make them) be water-dispersible and repulpable. This combination of requirements precludes the use of such conventional adhesives as normally tacky and pressure-sensitive rubber-resin adhesives. In the past, several water-soluble, pressure-sensitive adhesives have been devised and employed commercially, but none has been able to achieve the desired combination of physical properties and low cost.

An early adhesive used in splicing paper was polyacrylic acid, a water-soluble polymer which is rubbery in the presence of water but which becomes brittle and friable at low humidities. Sohl U.S. Pat. No. 2,838,421 discloses a splicing tape in which related rubbery polymer adhesives are blended with polypropylene glycol to impart flexibility, particularly in low humidity environments. Double-coated paper tapes made with such adhesives have been widely used in the papermaking and printing industry; although excellent in many respects, the release from the linear interleaved in the roll of tape is adversely influenced by high ambient humidity.

Peterson U.S. Pat. No. 3,441,430 discloses a splicing tape product in which the pressure-sensitive adhesive is a water-soluble acrylic acid:ether acrylate copolymer tackified with a liquid water-soluble plasticizer containing at least one ether linkage. Because of the ether linkage, this adhesive is inherently sensitive to oxidation, and its performance characteristics are greatly influenced by conditions to which it has previously been subjected. For example, exposure to high temperature (either before or after use in splicing) tends to reduce tackiness, flexibility, and repulpability. It is not always possible to protect the tape from such conditions.

Olson U.S. Pat. No. 3,661,874 discloses a water-soluble pressure-sensitive adhesive made by reacting an epoxidized rubbery polymer with a water-soluble secondary monoamine and tackifying the polymer with a water-soluble tackifier-plasticizer. When carefully formulated, this adhesive has outstanding physical characteristics, meeting all the requirements imposed by the papermaking industry, but the manufacturing process is complex and hence expensive.

Blake U.S. Pat. No. 3,865,770 discloses a water-dispersible pressure-sensitive adhesive in which an acrylate:vinyl carboxylic acid copolymer is reacted with a lower secondary or tertiary alkanolamine to impart water solubility, tackifiers (e.g., rosin) or plasticizers (oily, water-soluble polyoxyethylene compounds) being added if necessary. Adhesives of this type have excellent tackiness and heat stability, are readily repulpable, and are comparatively inexpensive. Special problems arise, however, when adhesives of this type are used to splice carbonless paper, the alkanolamine tending to volatilize and migrate, defeating the effectiveness of carbonless paper to perform its intended function, either by forming a stable complex with nickel ion which would otherwise react with a dithiooxamide derivative or by neutralizing the acidic substance which would otherwise impart color to an acid-activated dye.

Blake copending U.S. patent application Ser. No. 390,638, filed June 21, 1982 (now U.S. Pat. No. 4,413,080), discloses a water-dispersible pressure-sensitive adhesive intended for use in splicing carbonless papers. This adhesive is a blended reaction product of acrylate, acidic rosin or rosin derivative, potassium hydroxide, sodium and/or lithium hydroxide, and an oily plasticizing water-soluble polyoxyethylene compound. Although effective in many circumstances, upon exposure to elevated temperatures, the plasticizer may separate and migrate into layers of paper adjacent the splice, causing transparentization and decreased adhesion. In addition, some of the NaOH present may migrate with the plasticizer desensitizing to some extent, the color-changing ability of the carbonless paper.

SUMMARY OF THE INVENTION

The present invention provides a water-dispersible normally tacky and pressure-sensitive adhesive having all the advantages of the adhesive of aforementioned U.S. Pat. No. 4,413,080, together with the additional advantage that it can be used to splice carbonless paper without adversely affecting its performance. Substantially no adhesive separation occurs, even in the presence of high temperatures, pressures, and humidities.

The adhesive of the invention comprises the blended reaction product of
(a) 100 parts by weight of a copolymer of monomers consisting essentially of
  (1) about 60–85 weight percent of at least one monomeric acrylic acid ester of nontertiary alkyl alcohol having 4–14 carbon atoms and
  (2) correspondingly about 40–15 weight percent of vinyl carboxylic acid,
(b) about 50 to 250 parts by weight of ethoxylated plasticizing components, sufficient to impart adhesion values such as to cause the adhesive to delaminate kraft paper when tested as described herein, consisting essentially of at least one of the following:
  (1) up to about 125 parts by weight, but not so much as to cause adhesive separation, of one or more OH-functional ethoxylated plasticizers and
  (2) one or more electrolyte-tolerant complex acidic esters of phosphoric acid and an ethoxylated nonionic surfactant, and
(c) alkaline hydroxide consisting essentially of
  (1) sodium hydroxide, lithium hydroxide, or both sodium and lithium hydroxide in an amount sufficient to enhance shear strength and minimize bleeding but insufficient to cause separation of any OH-functional ethoxylated plasticizer present, not exceeding about 0.07 hydroxyl equivalent if OH-functional ethoxylated plasticizer is the only plasticizing component present, and (2) potassium hydroxide in an amount sufficient to promote water solubility.

Preferably, tackifying rosin or rosin derivative (especially 75–150 parts by weight) is incorporated in the adhesive to promote compatibility of the ethoxylated plasticizers with the other adhesive components and to enhance adhesion to paper. Presently preferred embodiments of the invention also incorporate both OH-functional ethoxylated plasticizer and phosphoric acid ester, about 50 to 100 parts by weight of each proving highly satisfactory. In these embodiments, the total amount of sodium hydroxide and lithium hydroxide provides from about 0.02 to about 0.2 hydroxyl equivalent, and the potassium hydroxide provides from about 0.1 to about 0.6 hydroxyl equivalent.

Expressed in a somewhat different manner, another preferred embodiment of the invention comprises the just described adhesive wherein the blended reaction product consists essentially of (a) 100 parts by weight of a copolymer of monomers consisting essentially of
  (1) about 60–85 weight percent of at least one monomeric acrylic acid ester of nontertiary alkyl alcohol having 4–14 carbon atoms and
  (2) correspondingly about 40–15 weight percent of vinyl carboxylic acid,
(b) about 100 to 250 parts by weight of plasticizing components, of which
  (1) at least about 50 parts by weight are one or more acidic esters of phosphoric acid and ethoxylated alcohol or phenol derivative and
  (2) the balance is made up of one or more ethoxylated diamines, and
(c) sufficient sodium hydroxide to neutralize at least about 20% of the copolymer acid function.

The phosphoric acid ester is far more electrolyte-tolerant than the OH-functional polyoxethylene plasticizers, which were described in aforementioned U.S. Pat. No. 4,413,080. As a result, these esters do not separate from the adhesive composition, even when present in large quantities, when the NaOH content is high, or when the adhesive is exposed to high temperatures, pressures, or humidities. The OH-functional ethoxylated plasticizers may still be used but must not be present in an amount sufficient to cause adhesive separation.

It is considered desirable to include an extremely small amount of polyamide-epichlorohydrin crosslinking resin; the presence of this specific crosslinking agent greatly improves both firmness and resistance to bleeding. If used in excessive amounts, however, the crosslinking resin will decrease water solubility and repulpability to unacceptably low levels.

As will be apparent from the ranges indicated above, substantial variations in composition are possible. To illustrate, the use of higher percentages of short-chain acrylates in a copolymer tends to increase the hardness of the adhesive, decreasing its tackiness; in such event, it is desirable to use a comparatively higher percentage of plasticizer. On the other hand, high percentages of long chain acrylates increase the tackiness of an adhesive and reduce the need for plasticizers. Similarly, the higher the percentage of vinyl carboxylic acid in the copolymer, the lower the degree of neutralization necessary to insure water-solubility. The use of such well-known acrylate monomers is iso-octyl acrylate increases the tackiness of the ultimate adhesive and improves its adhesion to paper; on the other hand, the resultant copolymer is harder to dissolve and generally requires the addition of either more rosin or more solvent than would otherwise be the case. In general, if an insufficient amount of rosin is included, ethoxylated plasticizer (if present) may tend to separate from the ionic neutralized acrylate polymer, while if too much rosin is included, the tackiness of the adhesive is reduced.

It is important to use more than one alkali metal hydroxide in connection with neutralization, the use of only sodium and/or lithium hydroxide increasing shear but tending to reduce tackiness of the adhesive to an undesirably low level. On the the other hand, neutralization with only potassium hydroxide increases the tackiness of the adhesive but decreases its shear value and increases its bleeding tendency.

Test Procedures

It is believed that a brief explanation of certain test procedures, used to evaluate various characteristics of water-soluble pressure-sensitive adhesives and tapes made therewith, will be helpful in understanding the invention.

Rolling Ball Tack

In this test an 11-mm diameter steel ball is rolled down a plane having a length of 18 cm and inclined at an angle of 21°30' to a horizontal surface on which the tape to be evaluated is positioned, adhesive side up, the adhesive thickness being at least 25 micrometers. The distance the ball rolls along the horizontal adhesive surface is measured, the tack being inversely proportional to the distance. Further details of this test are found in Test Methods for Pressure Sensitive Tapes, 7th Edition, Pressure Sensitive Tape Council, Glenview, Ill. 60025, Test No. PSTC-6. Generally speaking, although not always, adhesives used in the practice of this invention will have a rolling ball tack value of no more than 15 cm. Where tape is to be used in splicing rolls of paper together at speeds of perhaps 1000 m/minute (i.e., in making so-called flying splices), tack values of less than 5 cm are greatly preferred.

Certain adhesives embodying the invention yield high rolling ball tack values (greater than 15 cm), yet adhere aggressively to paper. These adhesives, which are usually considered relatively firm, would not function well in making flying splices but would function extremely well in making finished roll splices. The following test, which is useful in evaluating the ability of both tacky and firm adhesives to adhere to paper.

180° Peel Adhesion to Paper

A 3.175 cm strip of kraft paper is laminated to a 5 cm × 12.5 cm stainless steel test panel using a double-faced pressure-sensitive tape. One end of a 2.54 cm × 25 cm strip of sample tape having a 68 g/m² kraft paper backing is then laid over the laminated kraft paper. Uniform adhesive contact is assured by quickly (1 second) passing a 2 kg roller over the 12.5-cm sample length.

The tape is then doubled back on itself and peeled from the kraft paper surface at 30.5 cm/minute, using a method generally equivalent to that described in Test PSTC-1 "Test Methods for Pressure Sensitive Tapes", 7th Edition, Pressure Sensitive Tape Council, Glenview, Ill., 60025. If the tape adheres well to the kraft paper, the numerical result may be unimportant, as it may reflect only the force necessary to delaminate the paper surface. In such a case, delamination should be the reported result. Preferred adhesives will cause delamination.

Shear Adhesion

A 2.54-cm×2.54-cm end portion of a 2.54-cm×15-cm strip of tape, formed by coating a 25-micrometer thick layer of adhesive on 68 g/m$^2$ supercalendered kraft paper backing, is adhered to a bright annealed steel test panel and rolled down with two passes of a 2-kg roller. The panel is then clamped in a jig which is disposed at 2° to the vertical, so that the 12.5-cm free end of the tape extends downward, at an angle of 178° to the test panel, and a 1000-gram weight is attached to the tape end. The time for the tape to separate from the panel is reported in to the nearest minute, the shear strength being directly related to the elapsed time. Further details are found in the aforementioned Test Methods for Pressure-Sensitive Tapes, Test PSTC-7. For tapes made with adhesive of this invention, it is desirable to have shear time as high as possible, preferably exceeding 100 minutes, although an extremely tacky adhesive may be satisfactory if its shear time is as low as 40 minutes.

Repulpability

A 20-cm×2.54-cm strip of double-coated splicing tape is sandwiched between two 20-cm×2.54-cm strips of blotter paper* and cut into approximately 1.5-cm squares. To these squares are added a sufficient number of 1.5-cm squares of blotter pater to make a total of 15 grams, after which all the squares are placed in a Waring Blendor with 500 ml of water. After the blendor has run for 20 seconds, the stock that has splattered up the sides and onto the cover is washed back into the bottom with a water bottle. The blendor is again run for 20 seconds, washed as before, and run for a final 20 seconds. The stock is then removed from the blendor, rinsed twice with water, and made into a hand sheet, using a large sheet mold. The sheet is couched off the mold, pressed between blotters for 1½ minutes in a hydraulic press, removed, dried, and examined for any particles of unrepulped splicing tape. If no such particles are present, the tape is considered satisfactory. Further details are found in TAPPI Test UM-213.
* For tape having adhesive on only one side, two 20-cm×2.54-cm strips are adhered to blotter paper.

The foregoing test does not apply to tape products where, e.g., the backing is a polyester film, which does not lend itself to repulping. Such backings are strong, however, and may be used in splicing tape, provided the loosened backing is mechanically removed from the beater.

The rolling ball tack test and repulpability test are equally applicable to transfer tapes, where the adhesive layer, (or, optionally two layers of adhesive flanking a fibrous reinforcing layer) is carried by a strippable release liner. In using such tapes, the exposed surface of the adhesive is placed in contact with a first sheet of paper, the liner stripped away, and a second sheet of paper adhered to the newly exposed adhesive surface.

Plasticizer Separation and Carbonless Paper Deactivation

Since carbonless papers function by the interaction of chemical materials on two separate paper surfaces, samples for this test must be prepared using both of the papers involved. A 2.54-cm strip of the subject tape is adhered to the side of the paper opposite the coated side to be evaluated and the resulting laminate placed in a 65° C. oven for 24 hours, after which the paper is examined for plasticizer separation and absorption into the paper, as evidenced by transparentization. Each of the taped samples is then paired with a fresh sheet of the complementary paper. The paired sheets are placed in a typewriter and a message is typed over the area where the tape has been in contact with the paper. Any abnormality in the development of the carbonless image is noted.

Bleeding Tendency

This test qualitatively measures the tendency of an adhesive to bleed through a paper sheet when subjected to pressure and/or elevated temperatures. Strips of double-faced tape, both adhesive coatings being on the type to be evaluated, are placed between two sheets of the paper chosen, after which several additional sheets of the paper are laid on each side of the sandwich formed. The resultant sample is placed in a platen press for 15 hours at about 10 kg/cm$^2$ pressure and 40° C. and subsequently examined. Bleeding is deemed "slight" and the adhesive is considered acceptable if it bleeds no more than slightly into the first sheet and does not adhere to the second sheet. If it bleeds through the first sheet and adheres only lightly to the second (i.e., blocks), it is considered less desirable but may be acceptable. Unsatisfactory adhesives adhere tightly to, and possibly bleed through, a second sheet, a condition designated "severe". Results obtained in this test will, of course, vary with the specific paper used and the ambient humidity and temperature, but comparisons of tapes run within the same set can usually be made with validity.

DESCRIPTION OF PRESENTLY PREFERRED EMBODIMENTS

It is believed that understanding of the invention will be enhanced by considering several illustrative but non-limiting examples. In each case, an acrylate:vinyl carboxylic acid copolymer was prepared, generally as described in Ulrich U. S. Pat. No. Re. 24,906. The monomers to be copolymerized were dissolved in ethyl acetate and, using azobisisobutyronitrile as a catalyst, the solution held at 53° C. for 24 hours, at which time polymerization was largely completed. To the resultant viscous solution was then added sufficient methanol to reduce the solids content to about 20–22%.

A separate composition was prepared by mixing phosphoric acid ester and/or OH-functional ethoxylated plasticizer, methanol, water, and alkali metal hydroxides. When rosin or rosin derivatives are used, they are introduced into this composition. Mixing time is increased when solid rosin is present. The final mixture is a clear, colorless to amber, low viscosity solution. Appropriate amounts of the composition were blended into the acrylate:vinyl carboxylic acid copolymer, yielding a clear, substantially colorless to amber solution. This solution was coated directly on a 68 g/m$^2$ supercalendered kraft paper backing and the solvent evaporated to leave a layer of normally tacky and pressure-sensitive adhesive on the order of 25 micrometers thick. The resultant tape product was then evaluated, using the previously described test procedures.

For convenience, the examples are set forth below in tabular form, all prepared substantially in accordance with the procedure just described, parts and percentages being by weight unless otherwise noted. The effect of varying the types, ratios, and amounts of various components will be readily apparent from examining the reported data. In many instances, adhesives which perform unsatisfactorily are capable of ready modification to improve their performance significantly. The following abbreviations have been employed:

| | Acrylate monomers |
|---|---|
| BA | butyl acrylate |
| IOA | iso-octyl acrylate |
| | Vinyl Carboxylic Acid Monomers |
| AA | acrylic acid |
| | Rosins |
| TORD | disproportionated tall oil rosin |
| TORP | polymerized tall oil rosin |
| WR | wood rosin |
| WRH | hydrogenated wood rosin |
| WRP | polymerized wood rosin |
| | Phosphoric Acid Esters |
| PE-510 | clear to slightly hazy, viscous liquid having an aromatic hydrophobic base, a density of 1.08–1.09, and an acid number (mg KOH/g product) to first inflection point (pH 5.5) of 49–59, available from GAF Corporation under the registered trademark "Gafac" PE-510 |
| RE-610 | Slightly hazy, viscous liquid having an aromatic hydrophobic base, a density of 1.10–1.12, and an acid number of 62–72, available from GAF Corporation as "Gafac" RE-610 |
| RS-610 | Hazy, viscous liquid having an aliphatic hydrophobic base, a density of 1.04–1.06, and an acid number of 75–85, available from GAF Corporation as "Gafac" RS-610. |
| | OH—Functional Ethoxylated Plasticizers |
| T/13 | PEG-3 tallow aminopropylamine, available from Armak under the registered trademark "Ethoduomeen" T/13 |
| T/20 | PEG-10 tallow aminopropylamine, available from Armak as "Ethoduomeen" T/20 |
| T/25 | PEG-15 tallow aminopropylamine, available from Armak as "Ethoduomeen" T/25 |
| | ("PEG" followed by a number refers to moles of polyoxyethylene glycol.) |
| I52 | Ethoxylated octylphenol having an oxyethylene content of about 52%, available from GAF Corporation under the registered trademark as "Igepal" CA-520 |
| I62 | Ethoxylated nonylphenol having an oxyethylene content of about 63%, available from GAF Corporation as "Igepal" CO-630 |

| EX. | COPOLYMER PARTS BA | PARTS IOA | PARTS AA | COOH EQUIV | METAL HYDROXIDE NaOH OH EQUIV | % CO-POLYMER COOH FUNCTION | KOH OH EQUIV | % CO-POLYMER COOH FUNCTION | PLASTICIZERS H₃PO₄ TYPE | ESTER PARTS | OH-FUNCTIONAL ETHOXYLATED TYPE | PARTS | ROSIN OR ROSIN DERIVATIVE TYPE | PARTS | % POLYAMIDE: EPI-CHLOROHYDRIN CROSSLINKER | ROLLING BALL TACK, CM | SHEAR ADHESION, MIN. | BLEEDING TENDENCY |
|---|---|---|---|---|---|---|---|---|---|---|---|---|---|---|---|---|---|---|
| 1 | 75 | — | 25 | 0.347 | 0.208 | 60 | 0.223 | 64 | PE-510 | 231 | — | — | — | — | — | 2.9 | 38 | NONE |
| 2 | 75 | — | 25 | 0.347 | 0.208 | 60 | 0.223 | 64 | PE-510 | 231 | — | — | — | — | 0.031 | 1.9 | 67 | NONE |
| 3 | 75 | — | 25 | 0.347 | 0.208 | 60 | 0.223 | 64 | PE-510 | 231 | — | — | — | — | 0.062 | 1.9 | 117 | NONE |
| 4 | 75 | — | 25 | 0.347 | 0.208 | 60 | 0.223 | 64 | PE-510 | 231 | — | — | — | — | 0.093 | 2.2 | 205 | NONE |
| 5 | 75 | — | 25 | 0.347 | 0.208 | 60 | 0.223 | 64 | PE-510 | 231 | — | — | — | — | 0.125 | 1.9 | 215 | NONE |
| 6 | 75 | — | 25 | 0.347 | 0.278 | 80 | 0.223 | 64 | PE-510 | 238 | — | — | — | — | 0.125 | 2.5 | 65 | NONE |
| 7 | 75 | — | 25 | 0.347 | 0.347 | 100 | 0.235 | 68 | PE-510 | 243 | — | — | — | — | — | 1.6 | 88 | NONE |
| 8 | 75 | — | 25 | 0.347 | 0.174 | 50 | 0.186 | 54 | PE-510 | 191 | — | — | — | — | — | 2.5 | 48 | NONE |
| 9 | 75 | — | 25 | 0.347 | 0.139 | 40 | 0.186 | 54 | PE-510 | 191 | — | — | — | — | — | 2.9 | 38 | SL |
| 10 | 75 | — | 25 | 0.347 | 0.139 | 40 | 0.477 | 137 | PE-510 | 80 | T/20 | — | WRH | 136 | — | 5.5 | 186 | — |
| 11 | 75 | — | 25 | 0.347 | 0.139** | 40** | 0.464 | 134 | PE-510 | 75 | 163 | 79 | WRH | 136 | — | 17.0 | 296 | — |
| 12 | 75 | — | 25 | 0.347 | 0.139 | 40 | 0.471 | 136 | PE-510 | 75 | 163 | 79 | WRH | 136 | — | 10.4 | 211 | — |
| 13 | 75 | — | 25 | 0.347 | 0.139 | 40 | 0.483 | 139 | PE-510 | 80 | 163 | 74 | WRH | 136 | — | 4.1 | 320 | — |
| 14 | 75 | — | 25 | 0.347 | 0.139 | 40 | 0.520 | 150 | PE-510 | 126 | 163 | 53 | WRH | 136 | — | 5.6 | 111 | — |
| 15 | 75 | — | 25 | 0.347 | 0.139 | 40 | 0.186 | 73 | PE-510 | 191 | — | — | — | — | — | 2.5 | 48 | NONE |
| 16 | 75 | — | 25 | 0.347 | 0.208 | 60 | 0.198 | 57 | PE-510 | 203 | — | — | — | — | — | 3.2 | 60 | NONE |
| 17 | 75 | — | 25 | 0.347 | 0.208 | 60 | 0.198 | 57 | PE-510 | 203 | — | — | — | — | — | 2.9 | 290 | NONE |
| 18 | 75 | — | 25 | 0.347 | 0.035 | 10 | 0.469 | 135 | PE-510 | 95 | 163 | 75 | WRH | 86 | 0.125 | 2.9 | 1270 | — |
| 19 | 75 | — | 25 | 0.347 | 0.035 | 10 | 0.469 | 135 | PE-510 | 95 | 163 | 75 | WRH | 86 | 0.375 | 2.8 | 1136 | — |
| 20 | 75 | — | 25 | 0.347 | 0.035 | 10 | 0.469 | 135 | PE-510 | 95 | 163 | 75 | WRH | 86 | 0.50 | 2.2 | 965 | — |
| 21 | 75 | — | 25 | 0.347 | 0.104 | 30 | 0.321 | 92 | PE-510 | 71 | 163 | 50 | WRH | 86 | 0.625 | 3.7 | 517 | — |
| 22 | 75 | — | 25 | 0.347 | 0.104 | 30 | 0.321 | 92 | PE-510 | 71 | 163 | 50 | WRH | 86 | — | 2.0 | 230 | — |
| 23 | 75 | — | 25 | 0.208 | 0.052 | 15 | 0.607 | 175 | PE-510 | 172 | T/20 | 75 | WRH | 92 | — | 9.6 | 70 | — |
| 24 | 75 | — | 25 | 0.208 | 0.035 | 10 | 0.296 | 83 | PE-510 | 47 | 163 | 75 | WRH | 86 | 0.125 | 2.1 | 519+ | — |
| 25 | 75 | — | 25 | 0.208 | 0.035 | 10 | 0.321 | 92 | PE-510 | 71 | 163 | 50 | WRH | 86 | — | 65+ | 584+ | — |
| 26 | 75 | — | 25 | 0.208 | 0.035** | 10** | 0.246 | 71 | — | — | 163 | 125 | WRH | 86 | — | 15+ | 338 | — |
| 27 | 75 | — | 25 | 0.208 | 0.035 | 10 | 0.322 | 93 | PE-510 | 71 | 163 | 75 | WRH | 86 | — | 12.0 | 177 | — |
| 28 | 75 | — | 25 | 0.208 | 0.035 | 10 | 0.357 | 103 | PE-510 | 48 | 163 | 75 | WRH | 86 | — | 8.5 | 1417 | — |
| 29 | 75 | — | 25 | 0.208 | 0.035 | 10 | 0.383 | 110 | PE-510 | 71 | 163 | 50 | WRH | 86 | 0.094 | 8.3 | 1036 | — |
| 30 | 75 | — | 25 | 0.208 | 0.035 | 10 | 0.383 | 110 | PE-510 | 71 | 163 | 75 | WRH | 86 | 0.094 | 10.0 | 890 | — |
| 31 | 75 | — | 25 | 0.208 | 0.035 | 10 | 0.401 | 116 | PE-510 | 95 | 163 | 75 | WRH | 86 | 0.125 | 4.7 | 625 | — |
| 32 | 75 | — | 25 | 0.208 | 0.035 | 10 | 0.248 | 71 | — | — | 163 | 125 | WRH | 86 | 0.156 | 3.3 | 799 | — |
| 33 | 75 | — | 25 | 0.208 | 0.017 | 5 | 0.376 | 108 | PE-510 | 48 | 163 | 75 | WRH | 86 | — | 8.1 | 340 | — |
| 34 | 75 | — | 25 | 0.208 | 0.017 | 5 | 0.401 | 116 | PE-510 | 71 | 163 | 50 | WRH | 86 | — | 10.8 | 329 | — |
| 35 | 75 | — | 25 | 0.208 | — | — | — | — | PE-510 | 80 | T/25 | 74 | WRH | 86 | — | 16.7 | 250 | — |
| 36 | 75 | — | 25 | 0.347 | 0.069 | 20 | 0.186 | 54 | PE-510 | 191 | — | — | — | — | — | 8.3 | 23 | MOD. SEV. |
| 37 | 75 | — | 25 | 0.347 | — | — | 0.394 | 114 | PE-510 | 191 | — | — | — | — | — | 6.0 | 34 | — |
| 38 | 75 | — | 25 | 0.347 | 0.208 | 60 | 0.149 | 43 | PE-510 | 231 | — | — | — | — | — | 2.9 | 24 | — |
| 39 | 75 | — | 25 | 0.347 | 0.208 | 60 | 0.149 | 43 | PE-510 | 231 | — | — | — | — | — | 1.9 | 237 | — |
| 40 | 75 | — | 25 | 0.347 | 0.208 | 60 | 0.074 | 21 | PE-510 | 231 | — | — | — | — | — | 2.2 | 18 | — |
| 41 | 75 | — | 25 | 0.347 | 0.208 | 60 | 0.074 | 21 | PE-510 | 231 | — | — | — | — | — | 1.9 | 197 | — |
| 42 | 75 | — | 25 | 0.347 | 0.208 | 60 | — | — | PE-510 | 231 | — | — | — | — | — | 1.3 | 11 | — |
| 43 | 75 | — | 25 | 0.347 | 0.208 | 60 | — | — | PE-510 | 231 | — | — | — | — | — | 1.9 | 40 | — |
| 44 | 75 | — | 25 | 0.347 | 0.208 | 60 | 0.273 | 79 | RE-610 | 228 | — | — | — | — | — | 3.2 | 16 | — |

-continued

| EX. | COPOLYMER PARTS BA | COPOLYMER PARTS IOA | COPOLYMER PARTS AA | COOH EQUIV | METAL HYDROXIDE NaOH OH EQUIV | METAL HYDROXIDE NaOH % COPOLYMER COOH FUNCTION | METAL HYDROXIDE KOH OH EQUIV | METAL HYDROXIDE KOH % COPOLYMER COOH FUNCTION | PLASTICIZERS $H_3PO_4$ TYPE | PLASTICIZERS ESTER PARTS | PLASTICIZERS OH-FUNCTIONAL ETHOXYLATED TYPE | PLASTICIZERS OH-FUNCTIONAL ETHOXYLATED PARTS | ROSIN OR ROSIN DERIVATIVE TYPE | ROSIN OR ROSIN DERIVATIVE PARTS | % POLYAMIDE: EPICHLOROHYDRIN CROSSLINKER | ROLLING BALL TACK, CM | SHEAR ADHESION, MIN. | BLEEDING TENDENCY |
|---|---|---|---|---|---|---|---|---|---|---|---|---|---|---|---|---|---|---|
| 45 | 75 | — | 25 | 0.347 | 0.208 | 60 | 0.322 | 93 | RS-610 | 226 | — | — | — | — | — | 4.8 | 17 | — |
| 46 | 75 | — | 25 | 0.347 | 0.416 | 120 | — | — | PE-510 | 235 | — | — | — | — | — | 4.4 | 75 | — |
| 47 | 75 | — | 25 | 0.347 | 0.364 | 105 | — | — | PE-510 | 235 | — | — | — | — | — | 3.8 | 26 | — |
| 48 | 75 | — | 25 | 0.347 | 0.139 | 40 | 0.124 | 36 | PE-510 | 125 | T/20 | 83 | WRH | 75 | — | 2.5 | 36 | — |
| 49 | 75 | — | 25 | 0.347 | 0.139 | 40 | 0.124 | 36 | PE-510 | 125 | T/20 | 83 | WRH | 75 | — | 3.5 | 165 | — |
| 50 | 75 | — | 25 | 0.347 | 0.139 | 40 | 0.099 | 29 | PE-510 | 100 | T/20 | 83 | WRH | 75 | — | 2.9 | 77 | — |
| 51 | 75 | — | 25 | 0.347 | 0.139 | 40 | 0.074 | 21 | PE-510 | 75 | T/20 | 83 | WRH | 75 | — | 3.2 | 307 | — |
| 52 | 75 | — | 25 | 0.347 | 0.139 | 40 | 0.052 | 15 | PE-510 | 50 | T/20 | 83 | WRH | 75 | — | 10.2 | 1562 | — |
| 53 | 75 | — | 25 | 0.347 | 0.139 | 40 | 0.124 | 36 | PE-510 | 125 | T/25 | 55 | WRH | 50 | — | 2.2 | 67 | — |
| 54 | 75 | — | 25 | 0.347 | 0.139 | 40 | 0.124 | 36 | PE-510 | 125 | T/20 | 28 | WRH | 25 | — | 3.8 | 75 | — |
| 55 | 75 | — | 25 | 0.347 | 0.139 | 40 | 0.124 | 36 | PE-510 | 125 | T/20 | 83 | TORP | 75 | — | 5.1 | 63 | — |
| 56 | 75 | — | 25 | 0.347 | 0.139 | 40 | 0.124 | 36 | PE-510 | 125 | T/20 | 83 | WRP | 75 | — | 4.8 | 100 | — |
| 57 | 75 | — | 25 | 0.347 | 0.139 | 40 | 0.124 | 36 | PE-510 | 125 | T/20 | 83 | TORD | 75 | — | 4.8 | 81 | — |
| 58 | 75 | — | 25 | 0.347 | 0.139 | 40 | 0.124 | 36 | PE-510 | 125 | T/20 | 83 | WR | 75 | — | 2.2 | 64 | — |
| 59 | 75 | — | 25 | 0.347 | 0.139 | 40 | 0.124 | 36 | PE-510 | 125 | T/13 | 83 | WRD | 75 | — | 3.8 | 63 | — |
| 60 | 75 | — | 25 | 0.347 | 0.139 | 40 | 0.124 | 36 | PE-510 | 126 | T/20 | 83 | WRH | 13 | — | 3.8 | 86 | — |
| 61 | 75 | — | 25 | 0.347 | 0.174 | 50 | 0.198 | 57 | PE-510 | 203 | T/20 | 27 | — | — | — | 3.8 | 36 | — |
| 62 | 75 | — | 25 | 0.347 | 0.174 | 50 | 0.198 | 57 | PE-510 | 203 | T/20 | 27 | — | — | — | 1.9 | 29 | — |
| 63 | 75 | — | 25 | 0.347 | 0.174 | 50 | 0.198 | 57 | PE-510 | 203 | T/20 | 54 | — | — | — | 1.6 | 24 | — |
| 64 | 75 | — | 25 | 0.347 | 0.139 | 40 | 0.198 | 57 | RE-610 | 211 | — | — | WRH | 68 | — | 4.1 | 29 | — |
| 65 | 75 | — | 25 | 0.347 | 0.139 | 40 | 0.296 | 114 | RE-610 | 200 | — | — | WRH | 68 | — | 3.2 | 29 | — |
| 66 | 75 | — | 25 | 0.347 | 0.139 | 40 | 0.434 | 125 | RE-610 | 198 | — | — | WRH | 68 | — | 3.2 | 34 | — |
| 67 | 75 | — | 25 | 0.347 | 0.208 | 60 | 0.356 | 103 | PE-510 | 179 | — | — | WRH | 47 | — | 7.9 | 114 | — |
| 68 | 75 | — | 25 | 0.347 | 0.208 | 60 | 0.489 | 141 | PE-510 | 179 | — | — | WRH | 94 | — | 3.0 | 100 | — |
| 69 | 75 | — | 25 | 0.347 | 0.208 | 60 | 0.623 | 179 | PE-510 | 179 | — | — | WRH | 140 | — | 2.5 | 125 | — |
| 70 | 85 | — | 15 | 0.208 | 0.208 | 100 | 0.174 | 84 | PE-510 | 180 | — | — | — | — | — | 7.0 | 19 | — |
| 71 | 80 | — | 20 | 0.278 | 0.208 | 75 | 0.174 | 63 | PE-510 | 180 | — | — | — | — | — | 3.2 | 39 | — |
| 72 | 80 | — | 20 | 0.278 | 0.208 | 75 | 0.198 | 71 | PE-510 | 205 | — | — | — | — | — | 1.6 | 10 | — |
| 73 | 70 | — | 30 | 0.416 | 0.208 | 50 | 0.223 | 54 | PE-510 | 231 | — | — | — | — | — | 3.2 | 49 | — |
| 74 | 65 | — | 35 | 0.486 | 0.208 | 43 | 0.23 | 46 | PE-510 | 231 | — | — | — | — | — | 5.1 | 42 | — |
| 75 | 60 | — | 40 | 0.555 | 0.208 | 39 | 0.223 | 40 | PE-510 | 231 | — | — | — | — | — | 8.6 | 61 | — |
| 76 | 45 | 30 | 25 | 0.347 | 0.208 | 60 | 0.223 | 64 | PE-510 | 231 | — | — | — | — | — | 3.2 | 16 | — |
| 77 | 64 | 16 | 20 | 0.278 | 0.028 | 75 | 0.174 | 64 | PE-510 | 180 | — | — | — | — | — | 2.9 | 31 | — |
| 78 | 64 | 16 | 20 | 0.278 | 0.028 | 100 | 0.198 | 78 | PE-510 | 205 | — | — | — | — | — | 1.3 | 31 | — |
| 79 | 64 | 16 | 20 | 0.278 | 0.174 | 62 | 0.421 | 151 | PE-510 | 25 | 163 | 74 | WRH | 138 | — | 6.8 | 178 | — |
| 80 | 64 | 16 | 20 | 0.278 | 0.174 | 62 | 0.421 | 151 | PE-510 | 26 | 163 | 107 | WRH | 138 | — | 3.1 | 112 | — |
| 81 | 64 | 16 | 20 | 0.278 | 0.174 | 62 | 0.446 | 126 | PE-510 | 51 | 163 | 107 | WRH | 138 | — | 2.7 | 54 | — |
| 82 | 64 | 16 | 20 | 0.278 | 0.174 | 62 | 0.421 | 151 | PE-510 | 26 | 152 | 134 | WRH | 138 | — | 3.1 | 164 | — |
| 83 | 64 | 16 | 20 | 0.278 | 0.174 | 63 | 0.198 | 71 | PE-510 | 203 | T/20 | 27 | — | — | — | 1.3 | 34 | — |

*based on total adhesive solids
**LiOH used instead of NaOH

Those persons skilled in the art will recognize that it is not feasible to set forth all the variations to which this invention is susceptible, and many modifications will readily suggest themselves, especially if certain principles are borne in mind. For example, the shorter the chain length of the alcohol from which the acrylate monomer is derived, the firmer the resultant pressure-sensitive adhesive. If a softer adhesive is desired, the chain length of the alcohol may be increased. If greater shear strength for an adhesive made with a given copolymer is desired, a higher molecular weight, as evidenced by a higher inherent viscosity, can be used; alternatively, a small amount of a crosslinking agent can be incorporated if repulpability is not compromised in the final adhesive.

Other monomers such as fumarates may be incorporated to provide side chain attachments to the polymer backbone through pendent ester linkages in the same manner as acrylate esters.

It will likewise be recognized that, to achieve specific results, it may be desirable to incorporate minor amounts of monomeric modifiers into copolymers used to formulate adhesives of the invention, for example, styrene or methyl methacrylate increases firmness, tertiary butyl styrene increases tack, etc. Similarly, dyes, pigments, fillers, etc. may be added where necessary or desirable.

Although this information has been particularly described with respect to a splicing tape for papermaking and printing operations, the pressure-sensitive adhesive has many other uses. For example, water-soluble adhesive labels may be applied to dishes, windows, or other surfaces which it is commmon to clean with aqueous solvent. Cloth labels coated with this adhesive may readily be washed from garments to which they are affixed. Likewise, since the adhesive is substantially insoluble in most oils or similar hydrocarbon solvents, it may be employed in applications where conventional normally tacky and pressure-sensitive adhesive tapes prove unsatisfactory.

I claim:

1. Normally tacky and pressure-sensitive water-dispersible adhesive especially suitable for splicing carbonless paper, comprising the blended reaction product of
   (a) 100 parts by weight of a copolymer of monomers consisting essentially of
      (1) about 60-85 weight percent of at least one monomeric acrylic acid ester of nontertiary alkyl alcohol having 4-14 carbon atoms, and, correspondingly,
      (2) about 40-15 weight percent of vinyl carboxylic acid,
   (b) about 50 to 250 parts by weight of ethoxylated plasticizing components, sufficient to impart adhesion values such as to cause the adhesive to delaminate kraft paper when tested as described herein, consisting essentially of at least one of the following:
      (1) up to about 125 parts by weight, but not so much as to cause adhesive separation, of one or more OH-functional ethoxylated plasticizers and
      (2) one or more electrolyte-tolerant complex acidic esters of phosphoric acid and an ethoxylated nonionic surfactant, and
   (c) alkaline hydroxide consisting essentially of
      (1) sodium hydroxide, lithium hydroxide, or both sodium hydroxide and lithium hydroxide, in an amount sufficient to enhance shear strength and minimize bleeding but insufficient to cause separation of any OH-functional ethoxylated plasticizer present, not exceeding about 0.07 hydroxyl equivalent if OH-functional ethoxylated plasticizer is the only plasticizing component present, and
      (2) potassium hydroxide in an amount sufficient to promote water solubility.

2. The adhesive of claim 1 wherein the total amount of sodium hydroxide and lithium hydroxide provides from about 0.02 to about 0.2 hydroxyl equivalent and the potassium hydroxide provides from about 0.1 to about 0.6 hydroxyl equivalent.

3. The adhesive of claim 1 wherein the blended reaction product consists essentially of
   (a) 100 parts by weight of a copolymer of monomers consisting essentially of
      (1) about 60-85 weight percent of at least one monomeric acrylic acid ester of nontertiary alkyl alcohol having 4-14 carbon atoms, and, correspondingly,
      (2) about 40-15 weight percent of vinyl carboxylic acid,
   (b) about 100 to 250 parts by weight of plasticizing components, of which
      (1) at least about 50 parts by weight are one or more acidic esters of phosphoric acid and ethoxylated alcohol or phenol derivative and
      (2) any balance is made up of one or more ethoxylated diamines or ethoxylated phenols, and
   (c) sufficient sodium hydroxide to neutralize at least about 5% of the copolymer acid function.

4. The adhesive of claim 3 wherein the acrylic acid ester comprises butyl acrylate and the vinyl carboxylic acid comprises acrylic acid.

5. Normally tacky and pressure-senstive adhesive tape comprising a layer of the adhesive of claim 3 coated on a sheet backing.

6. The tape of claim 5 wherein a tackifying rosin or rosin derivative is included in the adhesive.

7. The tape of claim 5 wherein an extremely small amount of polyamide-epichlorohydrin crosslinking resin is included in the adhesive.

8. The tape of claim 5 wherein the adhesive consists essentially of 100 parts of a butyl acrylate: acrylic acid copolymer having a COOH equivalent in the approximate range of 0.25 to 0.45, sufficient NaOH to provide approximately 0.02-0.2 OH equivalent, sufficient KOH to provide approximately 0.1-0.6 OH equivalent, about 50-250 parts of plasticizer, and 0.08-0.50% by weight polyamide-epichlorohydrin resin crosslinker based on total adhesive solids.

9. The adhesive of claim 1 wherein the plasticizing components include both OH-functional ethoxylated plasticizer and acidic ester of phosphoric acid and ethoxylated alcohol or phenol derivative.

10. The adhesive of claim 9 wherein about 50 to 100 parts by weight of oily ethoxylated plasticizer are present.

11. The adhesive of claim 10 wherein about 50 to 100 parts by weight of the phosphoric acid ester are present.

12. The adhesive of claim 11 wherein from about 75 to about 150 parts by weight of rosin or rosin derivative are present.

13. Normally tacky and pressure-sensitive adhesive tape comprising a layer of the adhesive of claim 12 coated on a sheet backing.

14. The tape of claim 13 wherein an extremely small amount of polyamide-epichlorohydrin resin crosslinker is included in the adhesive.

* * * * *